(12) United States Patent
Huang

(10) Patent No.: US 7,050,609 B2
(45) Date of Patent: May 23, 2006

(54) BIOMETRIC DATA ACCEPTANCE METHOD

(75) Inventor: Lei Huang, Tokyo (JP)

(73) Assignee: NEC Corporation, Tokyo (JP)

( * ) Notice: Subject to any disclaimer, the term of this patent is extended or adjusted under 35 U.S.C. 154(b) by 758 days.

(21) Appl. No.: 09/789,829

(22) Filed: Feb. 22, 2001

(65) Prior Publication Data

US 2001/0019622 A1    Sep. 6, 2001

(30) Foreign Application Priority Data

Feb. 23, 2000    (JP)    .............................. 2000-045293

(51) Int. Cl.
*G06K 9/00*    (2006.01)
(52) U.S. Cl. ....................... 382/124; 382/278; 340/5.82
(58) Field of Classification Search ................ 382/100, 382/124, 125, 115, 117, 118, 127, 181, 190, 382/278, 276; 235/379, 382, 380, 375; 380/54; 707/1, 3, 6; 356/71; 713/200, 186, 102, 713/185; 340/5.8, 5.81, 5.82, 5.83
See application file for complete search history.

(56) References Cited

U.S. PATENT DOCUMENTS

| | | | | |
|---|---|---|---|---|
| 5,040,223 A | * | 8/1991 | Kamiya et al. | ............. 382/127 |
| 5,524,161 A | * | 6/1996 | Omori et al. | ............... 382/125 |
| 5,933,515 A | * | 8/1999 | Pu et al. | ...................... 382/124 |
| 5,963,679 A | * | 10/1999 | Setlak | .......................... 382/312 |
| 5,974,163 A | * | 10/1999 | Kamei | .......................... 382/125 |
| 6,166,370 A | * | 12/2000 | Sayag | .......................... 250/221 |
| 6,483,932 B1 | * | 11/2002 | Martinez et al. | ............ 382/124 |
| 6,487,321 B1 | * | 11/2002 | Edgar et al. | ................. 382/260 |
| 6,681,054 B1 | * | 1/2004 | Gindele | ...................... 382/272 |

FOREIGN PATENT DOCUMENTS

| | | |
|---|---|---|
| EP | 0 329 166 A2 | 8/1989 |
| JP | 61-255481 A | 11/1986 |
| JP | 61-272886 A | 12/1986 |
| JP | 63-192168 A | 8/1988 |
| JP | 3-224073 A | 10/1991 |
| JP | 4-33065 | 2/1992 |
| JP | 9-81728 A | 3/1997 |
| JP | 11-118415 A | 4/1999 |

\* cited by examiner

*Primary Examiner*—Sheela Chawan
(74) *Attorney, Agent, or Firm*—Sughrue Mion, PLLC (57) ABSTRACT

A biometric data acceptance method allowing input biometric data obtained by an incorrect input operation not to be accepted. At least one reference biometric image is stored in a memory. A degree of similarity between an input biometric image and a reference biometric image is calculated. It is determined that the input biometric image is acceptable, when the degree of similarity is smaller than a predetermined threshold. If the degree of similarity is not smaller than the predetermined threshold, the input biometric image is not acceptable.

38 Claims, 5 Drawing Sheets

BIOMETRIC DATA ACCEPTANCE METHOD

BACKGROUND OF THE INVENTION

1. Field of the Invention

The present invention relates to a biometric identification technique, and in particular to a biometric data acceptance method for use in biometric identification.

2. Description of the Related Art

In network-based information services, identification of individuals is one of the most important issues to ensure protection of communications security against abuse, unauthorized use, tempering by unauthorized persons, pretending to an authorized person, or the like. The identification must be accurate but not too cumbersome. To meet such a condition, there have been proposed a number of biometric identification techniques. Biometric data is data representing a certain human characteristic that is not changed over all one's life and is different from person to person, typically fingerprints, hand geometry, retinal scans, facial images and the like.

Taking fingerprint identification as an example, a user places his/her predetermined finger on a prism so as to display its fingerprint to a scanner such as a CCD image sensor. The input fingerprint image data is sent to a fingerprint verifier, in which feature data is extracted from the input fingerprint image data and then it is compared against previously stored fingerprint feature data. Since a fingerprint is a unique and distinctive pattern that presents unambiguous evidence of a specific person, accurate and simple identification of individuals can be achieved. Such a fingerprint identification system has been disclosed in Japanese Patent Application Unexamined Publication No. 4-33065.

In the above-described fingerprint identification system, it is necessary to previously register the feature data of a reference fingerprint that is used for comparison. In general, the scanner scans a user's finger on a prism to produce fingerprint image data and, if the number of pixels having gray levels greater than a predetermined gray level exceeds a predetermined value, it is determined that the input fingerprint image data is acceptable.

In order to register the reference fingerprint with reliability, the user's finger is usually scanned a plurality of times. A plurality of input fingerprint images obtained by the scanning operations are used to create the feature data of the user's fingerprint. For example, an input fingerprint image having the best quality is used to extract its feature data. Alternatively, a combination of several input fingerprint images may be used to create the feature data more suitable for comparison.

Such a fingerprint input method imposes the user to perform the fingerprinting operation a plurality of times. More specifically, the user must repeatedly place the finger on the scanner and move it off the scanner plural times to produce fingerprint patterns caused by different fingerprinting operations.

However, there may be cases where some user continuously places the finger on the scanner without moving it off to produce input fingerprint images by scanning it plural times. In such a case, the correct fingerprinting operation is not performed and therefore the fingerprint data obtained by such an incorrect fingerprinting operation should not be accepted.

SUMMARY OF THE INVENTION

An object of the present invention is to provide a biometric data acceptance method and apparatus allowing the input biometric data obtained by an incorrect operation of inputting biometric data not to be accepted.

According to the present invention, an apparatus for accepting a biometric image for biometric identification, includes: an input device for inputting a biometric image; a memory for storing at least one reference biometric image; and a determiner for determining whether an input biometric image is acceptable, depending on whether a degree of similarity between the input biometric image and a reference biometric image is smaller than a predetermined threshold.

The determiner may determine that the input biometric image is acceptable when the degree of similarity is smaller than the predetermined threshold. The determiner may determine that the input biometric image is not acceptable when the degree of similarity is not smaller than the predetermined threshold.

The apparatus may further include an output device for prompting a user to re-enter a biometric image through the input device when the determiner determines that a previously input biometric image is not acceptable.

The memory may store a reference biometric image that was accepted last time. The memory may store a plurality of reference biometric images that were inputted in the past, including a previously accepted biometric image. The determiner may calculate a degree of similarity between the input biometric image and each of the reference biometric images wherein, when all calculated degrees of similarity are smaller than the predetermined threshold, the determiner determines that the input biometric image is acceptable.

According to another aspect of the present invention, a fingerprint acceptance apparatus includes: an input device for inputting a fingerprint image; a memory for storing at least one reference fingerprint image; a similarity calculator for calculating a degree of similarity between the input fingerprint image and a reference fingerprint image; and a determiner for determining whether an input fingerprint image is acceptable, depending on whether the degree of similarity is smaller than a predetermined threshold.

The input device may be an optical scanner on which a user's finger is to be placed. The input device may include a semiconductor chip implementing a sensing function of sensing a fingerprint image by one of electrostatic capacitance system, heat-sensing system, and electric field sensing system.

The similarity calculator may calculate the degree of similarity between the input fingerprint image and a reference fingerprint image using an expression represented by $$|F \cap G|/|G|,$$

where $G=\{x|g(x)>T, x \in D\}$ where $g(x)$ is an input fingerprint image, $x$ is a coordinate vector of a pixel in a two-dimensional image plane, and $D$ is the whole image plane or a predetermined part thereof $F=\{x|f(x)>T, x \in D\}$, wherein $f(x)$ is a reference fingerprint image, and $|p|$ indicates the area of p or the number of pixels thereof.

The degree of similarity $\gamma(f, g)$ may be calculated by an expression represented by $$\gamma(f, g) = \frac{\int_D I_{(0,\infty)}(f(x) - T) I_{(0,\infty)}(g(x) - T) dx}{\int_D I_{(0,\infty)}(g(x) - T) dx}$$

$$I_{(0,x)}(y) = \begin{cases} 1 & y > 0, \\ 0 & y \le 0. \end{cases}$$

The degree of similarity may be obtained by using one of gray level correlation between the input fingerprint image and the reference fingerprint image and the number of pixels having same binary value in both the input fingerprint image and the reference fingerprint image.

The degree of similarity may be obtained by dividing the number of pixels having same binary value in both the input fingerprint image and the reference fingerprint image by the number of all pixels of the input fingerprint image.

The degree of similarity may be obtained by dividing the number of pixels having same binary value in both the input fingerprint image and the reference fingerprint image by the number of all pixels of the reference fingerprint image.

The degree of similarity may be obtained based on a degree of partial similarity calculated as to a partial image for the input fingerprint image and the reference fingerprint image.

According to yet another aspect of the present invention, a method includes the steps of: a) storing at least one reference biometric image in a memory; b) inputting a biometric image through an input device; c) calculating a degree of similarity between the input biometric image and a reference biometric image; and d) determining whether an input biometric image is acceptable, depending on whether the degree of similarity is smaller than a predetermined threshold.

As described above, according to the present invention, it is determined whether an input biometric image is similar to a previously accepted biometric image and thereby it is possible to determine whether the input biometric image should be accepted. Therefore, for example, if a user continuously places the finger on the scanner without moving it off, such an incorrect operation is rejected and the input image is not accepted.

In addition, according to the present invention, when the incorrect input operation is performed, it is possible to prompt the user to move it off and replace by a replacement message. Therefore, reliable image data can be obtained and accepted.

DESCRIPTION OF THE PREFERRED EMBODIMENTS

In the case where a user performs the fingerprinting operation plural times, it is almost impossible to place the finger at the same position on the scanner for each fingerprinting. Therefore, each input fingerprint pattern is naturally different. In other words, if the user repeatedly place the finger on the scanner and move it off plural times, then the similarity between plural input fingerprint patterns obtained by different fingerprinting operations may be relatively low. Contrarily, if the user continuously places the finger on the scanner without moving it off, then the similarity between plural input fingerprint patterns may be high. It is the same with other biometric data.

According to the present invention, it is determined whether the similarity between the current fingerprint pattern and the previously input fingerprint pattern is high or low and, if the similarity is high, then it is determined that the input fingerprint pattern is not acceptable. If the similarity is not high, then it is determined that the input fingerprint pattern is acceptable. The details of similarity decision will be described hereafter.

Similarity Decision

A similarity decision method included in an image data acceptance method according to the present invention is comprised of pattern extraction step (A), similarity calculation step (B), and similarity determination step (C).

In the pattern extraction step (A), a binary image processing method is used to extract an input pattern G and a reference pattern F from an input image $g(x)$ and a reference image $f(x)$, respectively. More specifically, the gray level of each pixel in the input image $g(x)$ is compared with a predetermined gray-level threshold T. Pixels having a gray level greater than T are extracted as the input pattern G from the input image $g(x)$. Therefore, the input pattern extraction is represented by the following expression:

$$G := \{x | g(x) > T, x \in D\} \quad (1),$$

where x is a coordinate vector of a pixel in a two-dimensional image plane and D is the whole image plane or a predetermined part thereof.

Similarly, the reference pattern extraction is represented by the following expression:

$$F := \{x | f(x) > T, x \in D\} \quad (2).$$

In the similarity calculation step (B), the input and reference patterns G and P are used to calculate the degree of similarity, $\gamma$, between the input image $g(x)$ and the reference image $f(x)$. If the input image $g(x)$ is similar to the reference image $f(x)$, it can be considered that almost all pixels of the input pattern G are overlapped with the reference pattern F.

Therefore, if the input image $g(x)$ is similar to the reference image $f(x)$, then $|F \cap G|/|G|$ is nearly equal to 1.0, where $|p|$ indicates the area of p or the number of pixels thereof, that is, $$|F \cap G|/|G| \sim 1.0 \quad (3).$$

Contrarily, if the input image $g(x)$ is not similar to the reference image $f(x)$, then $|F \cap G|/|G|$ is much smaller than 1.0, that is, $$|F \cap G|/|G| \ll 1.0 \quad (4).$$

More specifically, the degree of similarity γ(f, g) between the input image g(x) and the reference image f(x) is calculated by using the following equation:

$$\gamma(f, g) = \frac{\int_D I_{(0,\infty)}(f(x)-T)I_{(0,\infty)}(g(x)-T)dx}{\int_D I_{(0,\infty)}(g(x)-T)dx} \quad (5)$$

$$I_{(0,x)}(y) = \begin{cases} 1 & y > 0, \\ 0 & y \leq 0. \end{cases}$$

In the similarity determination step (C), it is determined based on the degree of similarity γ(f, g) whether the input image g(x) is similar to the reference image f(x). More specifically, the degree of similarity γ(f, g) is compared to a predetermined threshold of similarity, Tsim. If γ(f, g) exceeds Tsim, then it is determined that the user continuously places the finger on the scanner without moving it off and thereby the input fingerprint image is not accepted. Contrarily, if γ(f, g) is equal to or smaller than Tsim, then it is determined that the fingerprinting operation is properly performed and thereby the input fingerprint image is accepted.

The degree of similarity γ(f, g) may be obtained, for example, by the following method:
1) using gray-level correlation between the input image g(x) and the reference image f(x):
2) using the number of pixels having the same binary value "1" or "0" in both the input image g(x) and the reference image f(x);
3) dividing the number of pixels having the same binary value "1" or "0" in both the input image g(x) and the reference image f(x) by the number of pixels forming the whole input image; or
4) dividing the number of pixels having the same binary value "1" or "0" in both the input image g(x) and the reference image f(x) by the number of pixels forming the whole reference image.

Alternatively, after obtaining a degree of similarity as to a partial image for the input image g(x) and the reference image f(x) using one of the above methods, the degree of similarity γ(f, g) between the input image g(x) and the reference image f(x) may be calculated based on the degree of partial similarity.

Based on the similarity decision method as described above, preferred embodiments of the present invention will be described in detail, taking the case of fingerprinting as a typical example.

First Embodiment

Figure 1:
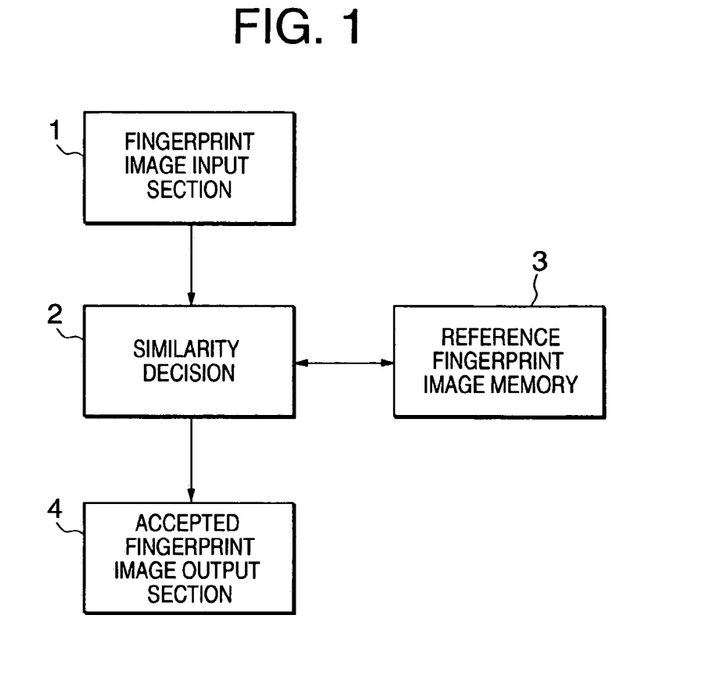
FIG. 1 is a block diagram showing a schematic configuration of a system employing a biometric data acceptance method according to a first embodiment of the present invention.

Referring to FIG. 1, a biometric data acceptance system according to a first embodiment includes a fingerprint image input section 1, a similarity decision section 2, a reference fingerprint image memory 3, and an accepted fingerprint image output section 4.

The fingerprint image input section 1 is provided with a fingerprint sensor that scans the fingerprint of a user's finger placed on a scan window to produce digital fingerprint image data. The fingerprint sensor may employ an optical sensing method or another sensing method. For example, the user's finger is placed on a semiconductor chip to sense protrusions and depressions of its fingerprint using electrostatic capacitance method, heat-sensing method, electric field sensing method or the like.

The reference fingerprint image memory 3 stores fingerprint image data that was accepted last time as reference fingerprint image data.

The similarity decision section 2 determines whether the current input fingerprint image is similar to the previously accepted fingerprint image stored in the reference fingerprint image memory 3. If the input fingerprint image is similar to the reference fingerprint image, then the similarity decision section 2 rejects the input fingerprint image.

Contrarily, if the input fingerprint image is not similar to the reference fingerprint image, then the similarity decision section 2 accepts the input fingerprint image to output it to the accepted fingerprint image output section 4. At the same time, the similarity decision section 2 updates the reference fingerprint image memory 3 by replacing the stored fingerprint image data with the currently accepted fingerprint image data.

The similarity decision section 2 may be implemented by a similarity decision program running on a microprocessor. The similarity decision program may be previously stored in a control memory (not shown) composed of a read-only memory (ROM), a non-volatile semiconductor memory, or the like.

Figure 2:
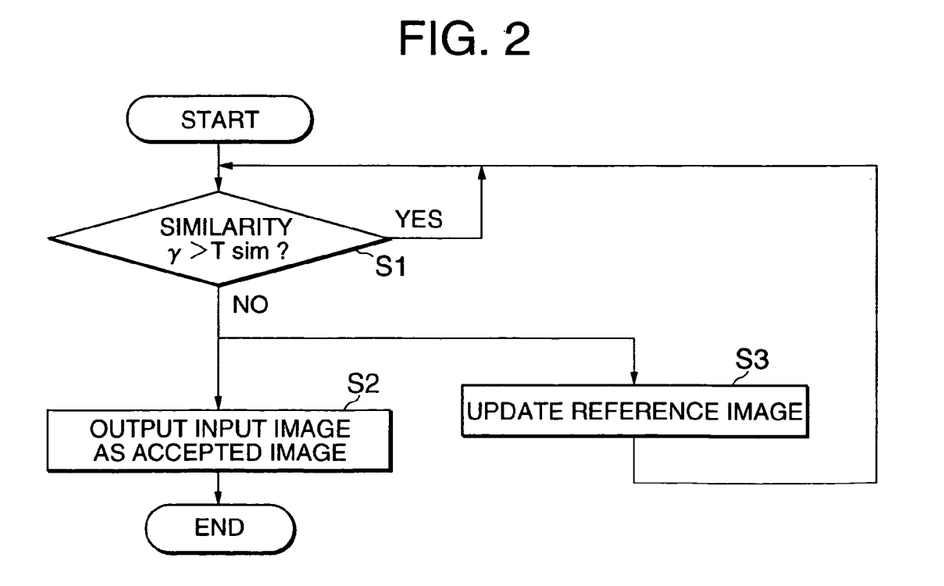
FIG. 2 is a flowchart showing the biometric data acceptance method according to the first embodiment.

Referring to FIG. 2, when inputting fingerprint image data from the fingerprint image input section 1, the similarity decision section 2 starts the similarity decision program to calculate the similarity between the input fingerprint image and the reference fingerprint image stored in the reference fingerprint image memory 3 as described before. Based on the similarity, it is determined whether the input fingerprint image is similar to the reference fingerprint image stored in the reference fingerprint image memory 3 (step S1).

When it is determined that the input fingerprint image is similar to the reference fingerprint image (YES at step S1), the similarity decision section 2 rejects the input fingerprint image. When it is determined that the input fingerprint image is not similar to the reference fingerprint image (NO at step S1), the similarity decision section 2 accepts the input fingerprint image to output it to the accepted fingerprint image output section 4 (step S2). At the same time, the similarity decision section 2 updates the reference fingerprint image memory 3 by replacing the stored fingerprint image data with the currently accepted fingerprint image data (step S3).

Second Embodiment

A biometric data acceptance system according to a second embodiment has basically the same system configuration as in the first embodiment of FIG. 1 except that the reference fingerprint image memory 3 stores a plurality of reference fingerprint images and the similarity decision section 2 performs searching operation against the reference fingerprint images.

Figure 3A:
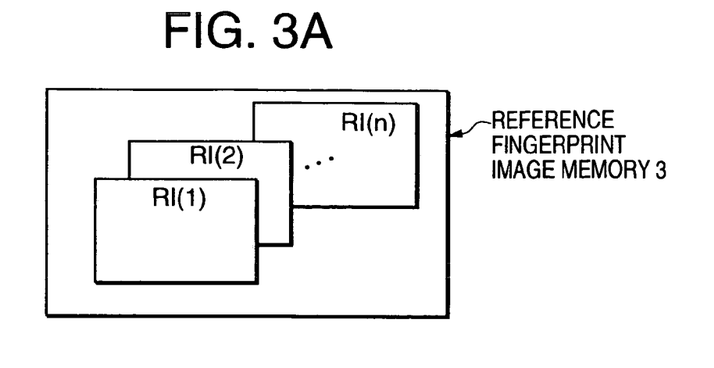
FIG. 3A is a diagram showing the contents of a reference fingerprint image memory in a system employing a biometric data acceptance method according to a second embodiment of the present invention.

As shown in FIG. 3A, the reference fingerprint image memory 3 stores a plurality of reference fingerprint images RI(1)–RI(n), which are all or partial fingerprint images that were inputted in the past, including the previously accepted fingerprint image. To reduce the time required for similarity decision, the number of reference fingerprint images stored in the reference fingerprint image memory 3 is preferably reduced.

The similarity decision section 2 may be implemented by a similarity decision program running on a microprocessor. The similarity decision program may be previously stored in a control memory (not shown) composed of a read-only memory (ROM), a non-volatile semiconductor memory, or the like.

Figure 3B:
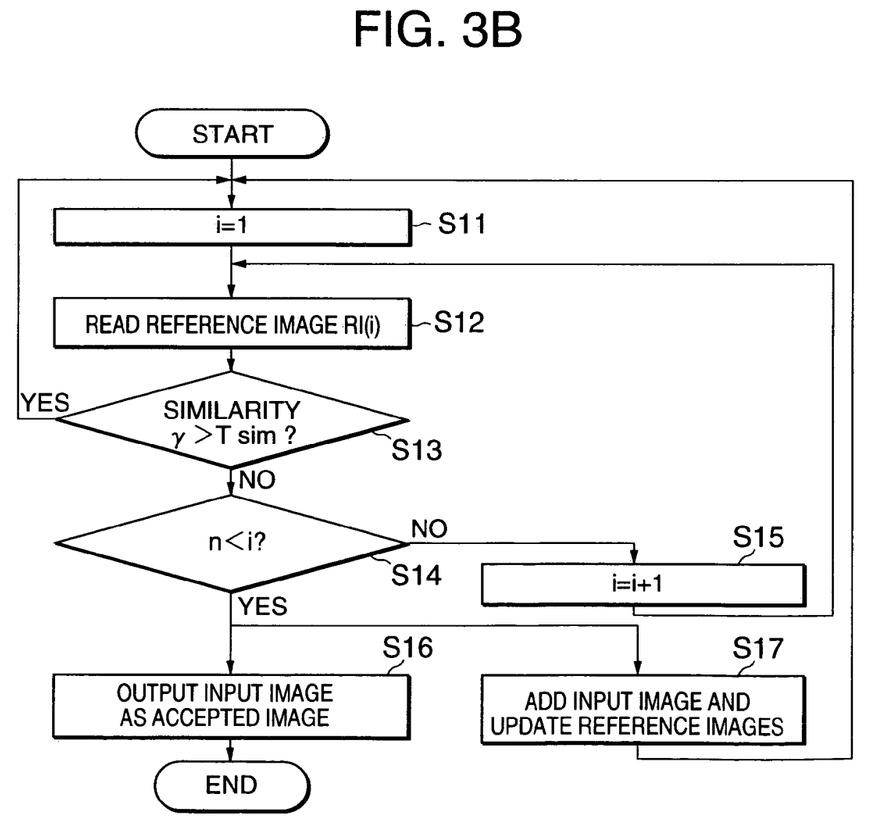
FIG. 3B is a flowchart showing a biometric data acceptance method according to the second embodiment.

Referring to FIG. 3B, when inputting fingerprint image data from the fingerprint image input section 1, the similarity decision section 2 starts the similarity decision program. After initializing a variable i to 1 (step S11), the similarity decision section 2 searches the reference fingerprint image memory 3 for a reference fingerprint image RI(i) (step S12). Thereafter, the similarity decision section 2 calculates the similarity between the input fingerprint image and the read reference fingerprint image RI(1) as described before. Based on the similarity, it is determined whether the input fingerprint image is similar to the reference fingerprint image RI(i) (step S13).

When it is determined that the input fingerprint image is similar to the reference fingerprint image RI(i) (YES at step S13) the similarity decision section 2 rejects the input fingerprint image and the control goes back to the step S11.

When it is determined that the input fingerprint image is not similar to the reference fingerprint image RI(i) (NO at step S13), it is determined whether the variable i exceeds a predetermined value n, which is the number of the reference fingerprint images stored in the reference fingerprint image memory 3 (step S14). When the variable i is not greater than n (NO at step S14), the variable i is incremented by one (step S15) and the control goes back to the step S12. In this manner, the steps S12–S15 are repeatedly performed while incrementing i until the variable i exceeds n.

When the variable i exceeds n, that is, all reference fingerprint images stored in the reference fingerprint image memory 3 have been read (YES at step S14), it means that no reference fingerprint image is similar to the input fingerprint image. Therefore, the similarity decision section 2 accepts the input fingerprint image to output it to the accepted fingerprint image output section 4 (step S16). At the same time, the similarity decision section 2 updates the reference fingerprint image memory 3 by adding the currently accepted fingerprint image data to the previously stored fingerprint image data (step S17).

Third Embodiment

A biometric data acceptance system according to a third embodiment has basically the same system configuration as in the first embodiment of FIG. 1 except that a message output function is added. Therefore, blocks similar to those previously described with reference to FIG. 1 are denoted by the same reference numerals and the details are omitted.

Figure 4:
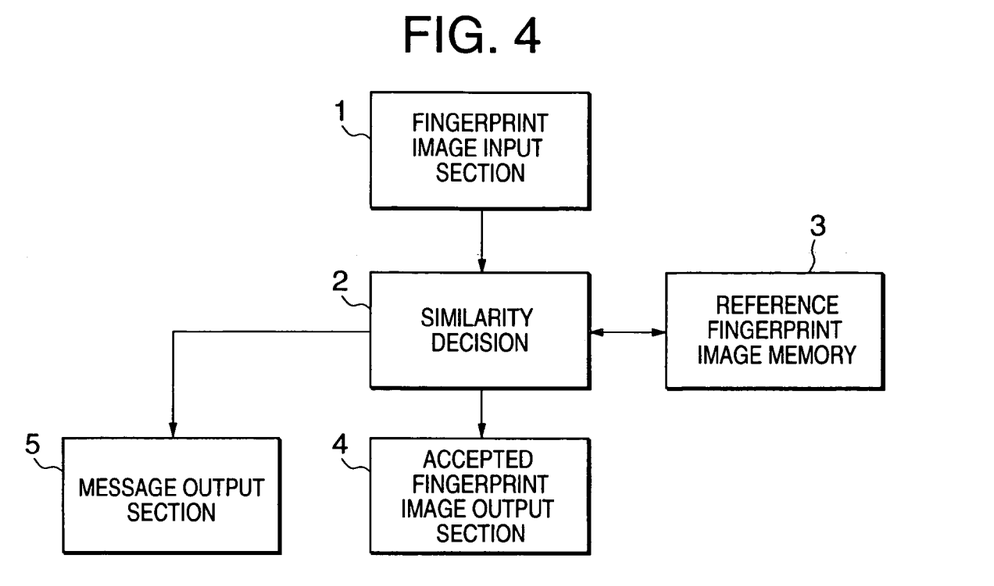
FIG. 4 is a block diagram showing a schematic configuration of a system employing a biometric data acceptance method according to a third embodiment of the present invention.

As shown in FIG. 4, a message output section 5 is connected to the similarity decision section 2. When the similarity decision section 2 determines that the input fingerprint image is similar to the reference fingerprint image, the similarity decision section 2 controls the message output section 5 so that the user is prompted to replace the finger on the scanner by display or sound. For example, the message output section 5 may include a display, a speaker, and/or a light-emitting diode.

The similarity decision section 2 may be implemented by a similarity decision program running on a microprocessor. The similarity decision program may be previously stored in a control memory (not shown) composed of a read-only memory (ROM), a non-volatile semiconductor memory, or the like.

Figure 5:
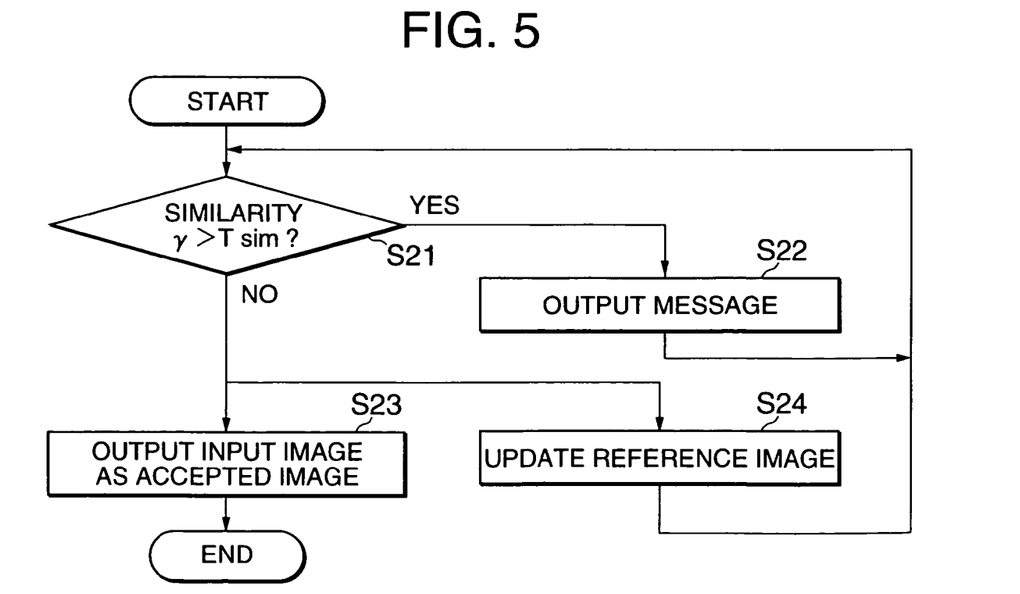
FIG. 5 is a flowchart showing the biometric data acceptance method according to the third embodiment.

Referring to FIG. 5, when inputting fingerprint image data from the fingerprint image input section 1, the similarity decision section 2 starts the similarity decision program to calculate the similarity between the input fingerprint image and the reference fingerprint image stored in the reference fingerprint image memory 3 as described before. Based on the similarity, it is determined whether the input fingerprint image is similar to the reference fingerprint image stored in the reference fingerprint image memory 3 (step S21).

When it is determined that the input fingerprint image is similar to the reference fingerprint image (YES at step S21), the similarity decision section 2 controls the message output section 5 so that the user is prompted to replace the finger on the scanner by display or sound (step S22) and the control goes back to the step S21.

When it is determined that the input fingerprint image is not similar to the reference fingerprint image (NO at step S21), the similarity decision section 2 accepts the input fingerprint image to output it to the accepted fingerprint image output section 4 (step S23). At the same time, the similarity decision section 2 updates the reference fingerprint image memory 3 by replacing the stored fingerprint image data with the currently accepted fingerprint image data (step S24).

Fourth Embodiment

A biometric data acceptance system according to a fourth embodiment has basically the same system configuration as in the first embodiment of FIG. 1 except that the reference fingerprint image memory 3 stores a plurality of reference fingerprint images, the similarity decision section 2 performs searching operation against the reference fingerprint images, and a message output function is added.

As shown in FIG. 3A, the reference fingerprint image memory 3 stores a plurality of reference fingerprint images RI(1)– RI(n), which are all or partial fingerprint images that were inputted in the past, including the previously accepted fingerprint image. To reduce the time required for similarity decision, the number of reference fingerprint images stored in the reference fingerprint image memory 3 is preferably reduced.

The similarity decision section 2 may be implemented by a similarity decision program running on a microprocessor. The similarity decision program may be previously stored in a control memory (not shown) composed of a read-only memory (ROM), a non-volatile semiconductor memory, or the like.

Figure 6:
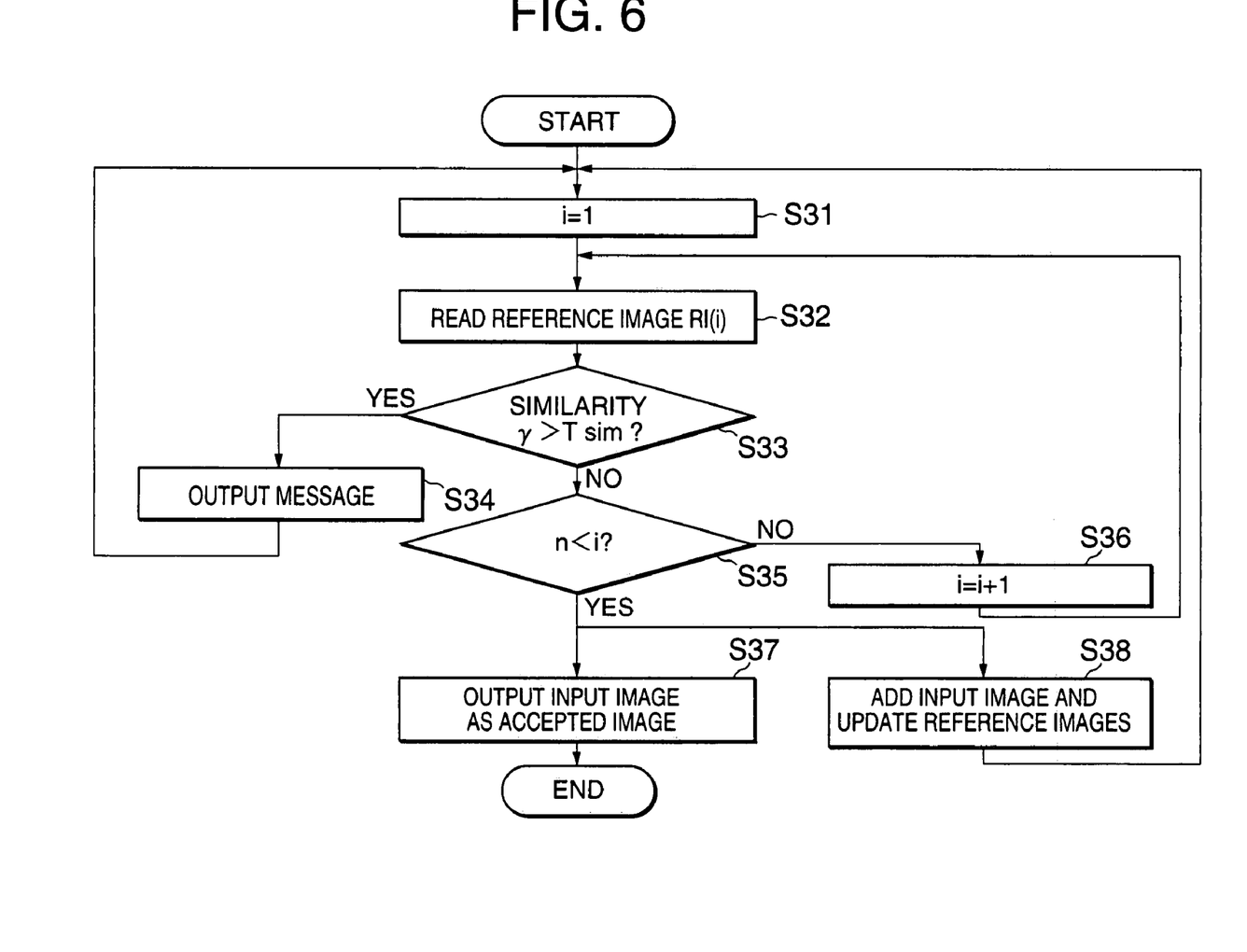
FIG. 6 is a flowchart showing a biometric data acceptance method according to a fourth embodiment of the present invention.

Referring to FIG. 6, when inputting fingerprint image data from the fingerprint image input section 1, the similarity decision section 2 starts the similarity decision program. After initializing a variable i to 1 (step S31), the similarity decision section 2 searches the reference fingerprint image memory 3 for a reference fingerprint image RI(i) (step S32). Thereafter, the similarity decision section 2 calculates the similarity between the input fingerprint image and the read reference fingerprint image RI(i) as described before. Based on the similarity, it is determined whether the input fingerprint image is similar to the reference fingerprint image RI(i) (step S33).

When it is determined that the input fingerprint image is similar to the reference fingerprint image RI(i) (YES at step S33), the similarity decision section 2 controls the message output section 5 so that the user is prompted to replace the finger on the scanner by display or sound (step S34) and the control goes back to the step S31.

When it is determined that the input fingerprint image is not similar to the reference fingerprint image RI(i) (NO at step S33), it is determined whether the variable i exceeds a predetermined value n, which is the number of the reference fingerprint images stored in the reference fingerprint image memory 3 (step S35). When the variable i is not greater than n (NO at step S35), the variable i is incremented by one (step S36) and the control goes back to the step S32. In this manner, the steps S32, S33, S35, and S36 are repeatedly performed while incrementing i until the variable i exceeds n.

When the variable i exceeds n, that is, all reference fingerprint images stored in the reference fingerprint image memory 3 have been read (YES at step S35), it means that no reference fingerprint image is similar to the input fingerprint image. Therefore, the similarity decision section 2 accepts the input fingerprint image to output it to the accepted fingerprint image output section 4 (step S37). At the same time, the similarity decision section 2 updates the reference fingerprint image memory 3 by adding the currently accepted fingerprint image data to the previously stored fingerprint image data (step S38).

As described before, the similarity decision section 2 may be implemented by a similarity decision program running on a program-controlled processor.

Figure 7:
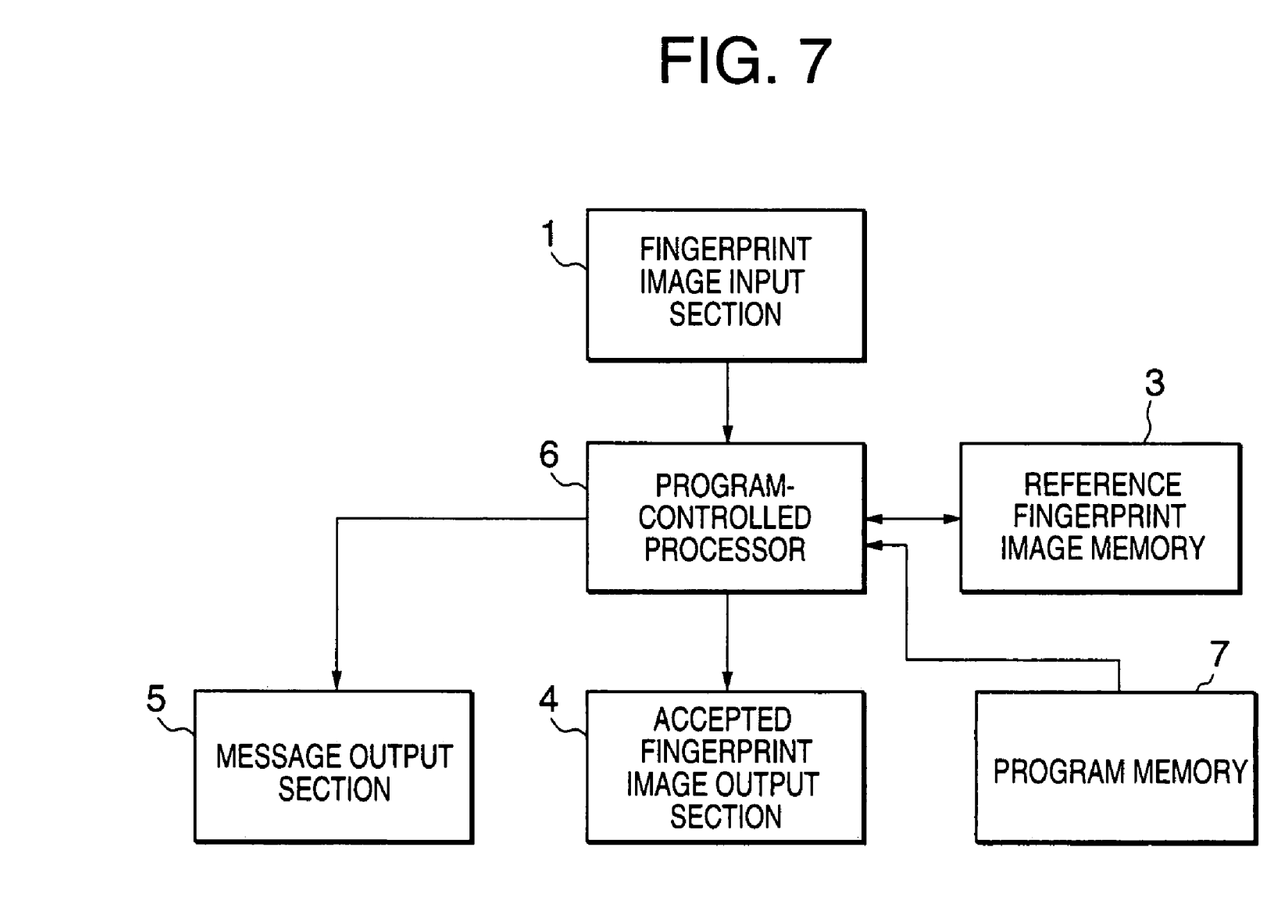
FIG. 7 is a block diagram showing a schematic configuration of a biometric data acceptance system using a program-controlled processor.

As shown in FIG. 7, for example, the biometric data acceptance system according to the third embodiment as shown in FIG. 4 may be implemented by replacing the similarity decision section 2 with a program-controlled processor 6. The similarity decision program is stored in a program memory 7 such as a read-only memory (ROM), a magnetic disk, a non-volatile semiconductor memory, or the like.

When inputting fingerprint image data from the fingerprint image input section 1, the program-controlled processor 6 reads the similarity decision program from the program memory 7 and starts the similarity decision process as described in FIG. 5.

As described above, according to the present invention, it is determined whether an input biometric image is similar to a previously accepted biometric image and thereby it is possible to determine whether the input biometric image should be accepted. Therefore, for example, if a user continuously places the finger on the scanner without moving it off, such an incorrect operation is rejected and the input image is not accepted.

In addition, according to the present invention, when the incorrect input operation is performed, it is possible to prompt the user to move it off and replace by a replacement message. Therefore, reliable image data can be obtained and accepted.

The invention claimed is:

1. An apparatus for accepting a biometric image for biometric identification, comprising:
    an input device for inputting a biometric image;
    a memory for storing at least one reference biometric image; and
    a determiner for determining whether an input biometric image is acceptable, depending on whether a degree of similarity between the input biometric image and a reference biometric image is smaller than a predetermined threshold.

2. The apparatus according to claim 1, wherein, when the degree of similarity is smaller than the predetermined threshold, the determiner determines that the input biometric image is acceptable.

3. The apparatus according to claim 2, wherein, when the degree of similarity is not smaller than the predetermined threshold, the determiner determines that the input biometric image is not acceptable.

4. The apparatus according to claim 1, further comprising:
    an output device for prompting a user to re-enter a biometric image through the input device when the determiner determines that a previously input biometric image is not acceptable.

5. The apparatus according to claim 1, wherein the memory stores a reference biometric image that was accepted last time.

6. The apparatus according to claim 1, wherein the memory stores a plurality of reference biometric images that were inputted in the past, including a previously accepted biometric image.

7. The apparatus according to claim 6, wherein the determiner calculates a degree of similarity between the input biometric image and each of the reference biometric images wherein, when all calculated degrees of similarity are smaller than the predetermined threshold, the determiner determines that the input biometric image is acceptable.

8. A fingerprint acceptance apparatus for accepting a fingerprint image, comprising:
    an input device for inputting a fingerprint image;
    a memory for storing at least one reference fingerprint image;
    a similarity calculator for calculating a degree of similarity between the input fingerprint image and a reference fingerprint image; and
    a determiner for determining whether an input fingerprint image is acceptable, depending on whether the degree of similarity is smaller than a predetermined threshold.

9. The fingerprint acceptance apparatus according to claim 8, wherein, when the degree of similarity is smaller than the predetermined threshold, the determiner determines that the input fingerprint image is acceptable.

10. The fingerprint acceptance apparatus according to claim 9, wherein, when the degree of similarity is not smaller than the predetermined threshold, the determiner determines that the input fingerprint image is not acceptable.

11. The fingerprint acceptance apparatus according to claim 8, wherein the input device is an optical scanner on which a user's finger is to be placed.

12. The fingerprint acceptance apparatus according to claim 8, wherein the input device comprises a semiconductor chip implementing a sensing function of sensing a fingerprint image by one of electrostatic capacitance system, heat-sensing system, and electric field sensing system.

13. The fingerprint acceptance apparatus according to claim 8, wherein the similarity calculator calculates the degree of similarity between the input fingerprint image and a reference fingerprint image using an expression represented by $$|F \cap G|/|G|,$$

where $G=\{x|g(x)>T, x \in D\}$ where $g(x)$ is an input fingerprint image, x is a coordinate vector of a pixel in a two-dimensional image plane, D is the whole image plane or a predetermined part thereof, and T is a predetermined gray-level threshold, $F=\{x|f(x)>T, x \in D\}$, wherein $f(x)$ is a reference fingerprint image.

14. The fingerprint acceptance apparatus according to claim 13, wherein the degree of similarity γ(f, g) is calculated by an expression represented by $$\gamma(f, g) = \frac{\int_D I_{(0,\infty)}(f(x)-T)I_{(0,\infty)}(g(x)-T)dx}{\int_D I_{(0,\infty)}(g(x)-T)dx}$$

$$I_{(0,x)}(y) = \begin{cases} 1 & y > 0, \\ 0 & y \le 0. \end{cases}$$

15. The fingerprint acceptance apparatus according to claim 8, wherein the degree of similarity is obtained by using one of gray-level correlation between the input fingerprint image and the reference fingerprint image and the number of pixels having same binary value in both the input fingerprint image and the reference fingerprint image.

16. The fingerprint acceptance apparatus according to claim 8, wherein the degree of similarity is obtained by dividing the number of pixels having same binary value in both the input fingerprint image and the reference fingerprint image by the number of all pixels of the input fingerprint image.

17. The fingerprint acceptance apparatus according to claim 8, wherein the degree of similarity is obtained by dividing the number of pixels having same binary value in both the input fingerprint image and the reference fingerprint image by the number of all pixels of the reference fingerprint image.

18. The fingerprint acceptance apparatus according to claim 8, wherein the degree of similarity is obtained based on a degree of partial similarity calculated as to a partial image for the input fingerprint image and the reference fingerprint image.

19. The fingerprint acceptance apparatus according to claim 8, further comprising:
    an output device for prompting a user to re-enter a fingerprint image through the input device when the determiner determines that a previously input fingerprint image is not acceptable.

20. The fingerprint acceptance apparatus according to claim 8, wherein the memory stores a reference fingerprint image that was accepted last time.

21. The fingerprint acceptance apparatus according to claim 8, wherein the memory stores a plurality of reference fingerprint images that were inputted in the past, including a previously accepted fingerprint image.

22. The fingerprint acceptance apparatus according to claim 21, wherein the similarity calculator calculates a degree of similarity between the input fingerprint image and each of the reference fingerprint images wherein, when all calculated degrees of similarity are smaller than the predetermined threshold, the determiner determines that the input fingerprint image is acceptable.

23. A method for accepting a biometric image, comprising the steps of:
    a) storing at least one reference biometric image in a memory;
    b) inputting a biometric image through an input device;
    c) calculating a degree of similarity between the input biometric image and a reference biometric image; and
    d) determining whether an input biometric image is acceptable, depending on whether the degree of similarity is smaller than a predetermined threshold.

24. The method according to claim 23, wherein, when the degree of similarity is smaller than the predetermined threshold, it is determined that the input biometric image is acceptable.

25. The method according to claim 24, wherein, when the degree of similarity is not smaller than the predetermined threshold, it is determined that the input biometric image is not acceptable.

26. The method according to claim 23, wherein the degree of similarity is calculated using an expression represented by $$|F \cap G|/|G|,$$

where G={x|g(x)>T, x∈D} where g(x) is an input biometric image, x is a coordinate vector of a pixel in a two-dimensional image plane, D is the whole image plane or a predetermined part thereof, and T is a predetermined gray-level threshold, F={x|f(x)>T, x ∈D}, wherein f(x) is a reference biometric image.

27. The method according to claim 26, wherein the degree of similarity γ(f, g) is calculated by an expression represented by $$\gamma(f, g) = \frac{\int_D I_{(0,\infty)}(f(x)-T)I_{(0,\infty)}(g(x)-T)dx}{\int_D I_{(0,\infty)}(g(x)-T)dx}$$

$$I_{(0,x)}(y) = \begin{cases} 1 & y > 0, \\ 0 & y \le 0. \end{cases}$$

28. The method according to claim 23, wherein the degree of similarity is obtained by using one of gray-level correlation between the input biometric image and the reference biometric image and the number of pixels having same binary value in both the input biometric image and the reference biometric image.

29. The method according to claim 23, wherein the degree of similarity is obtained by dividing the number of pixels having same binary value in both the input biometric image and the reference biometric image by the number of all pixels of the input biometric image.

30. The method according to claim 23, wherein the degree of similarity is obtained by dividing the number of pixels having same binary value in both the input biometric image and the reference biometric image by the number of all pixels of the reference biometric image.

31. The method according to claim 23, wherein the degree of similarity is obtained based on a degree of partial similarity calculated as to a partial image for the input biometric image and the reference biometric image.

32. The method according to claim 23, further comprising the steps of:
    prompting a user to re-enter a biometric image when it is determined that a previously input biometric image is not acceptable.

33. The method according to claim 23, wherein the memory stores a reference biometric image that was accepted last time.

34. The method according to claim 23, wherein the memory stores a plurality of reference biometric images that were inputted in the past, including a previously accepted biometric image.

35. The method according to claim 34, wherein a degree of similarity between the input biometric image and each of the reference biometric images wherein, when all calculated degrees of similarity are smaller than the predetermined threshold, it is determined that the input biometric image is acceptable.

36. A recording medium storing a program for instructing a computer to perform a biometric image acceptance method, the program comprising the steps of:
   a) storing at least one reference biometric image;
   b) inputting a biometric image through an input device;
   c) calculating a degree of similarity between the input biometric image and a reference biometric image; and
   d) determining whether an input biometric image is acceptable, depending on whether the degree of similarity is smaller than a predetermined threshold.

37. The recording medium according to claim 36, wherein, when the degree of similarity is smaller than the predetermined threshold, it is determined that the input biometric image is acceptable.

38. The recording medium according to claim 37, wherein, when the degree of similarity is not smaller than the predetermined threshold, it is determined that the input biometric image is not acceptable.

* * * * *